United States Patent
Kwon (10) Patent No.: US 11,198,463 B2
(45) Date of Patent: Dec. 14, 2021

(54) FOLDABLE STEERING WHEEL ASSEMBLY AND STEERING APPARATUS COMPRISING THE SAME

(71) Applicant: MANDO CORPORATION, Pyeongtaek-si (KR)

(72) Inventor: HyunBi Kwon, Yongin-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 0 days.

(21) Appl. No.: 17/226,269

(22) Filed: Apr. 9, 2021

(65) Prior Publication Data

US 2021/0316777 A1  Oct. 14, 2021

(30) Foreign Application Priority Data

Apr. 9, 2020  (KR) .................. 10-2020-0043385
Apr. 9, 2020  (KR) .................. 10-2020-0043395
Apr. 7, 2021  (KR) .................. 10-2021-0045468

(51) Int. Cl.
*B62D 1/10*      (2006.01)
*B62D 1/06*      (2006.01)
*B60R 21/09*     (2006.01)

(52) U.S. Cl.
CPC .............. *B62D 1/06* (2013.01); *B62D 1/10* (2013.01); *B60R 21/09* (2013.01)

(58) Field of Classification Search
CPC ............ B62D 1/10; B62D 1/06; B62D 1/04
See application file for complete search history.

(56) References Cited

U.S. PATENT DOCUMENTS

| | | | | |
|---|---|---|---|---|
| 764,967 A * | 7/1904 | Warner | ................... | B62D 1/10 74/555 |
| 1,374,830 A * | 4/1921 | Davis | ...................... | B62D 1/10 74/555 |
| 2,335,966 A * | 12/1943 | Roos | ...................... | B62D 1/10 74/555 |
| 4,934,479 A * | 6/1990 | Usina | ................. | B60R 25/0222 180/287 |
| 2007/0290494 A1* | 12/2007 | Ichikawa | ................ | B62D 1/10 280/775 |
| 2019/0118852 A1* | 4/2019 | Suzuki | .................... | B60T 7/042 |
| 2019/0308655 A1* | 10/2019 | Ochi | ...................... | B60K 37/02 |
| 2020/0198684 A1* | 6/2020 | Murray | ................... | B62D 1/06 |
| 2021/0016820 A1* | 1/2021 | Nozawa | ................ | B62D 1/181 |
| 2021/0031823 A1* | 2/2021 | Watanabe | ............. | B62D 1/183 |
| 2021/0229732 A1* | 7/2021 | Kastelic | ................... | B62D 1/10 |

FOREIGN PATENT DOCUMENTS

FR  333229 A  * 11/1903  ............... B62D 1/10

OTHER PUBLICATIONS

Machine Translation of FR 333229.*

* cited by examiner

*Primary Examiner* — Richard W Ridley
*Assistant Examiner* — Brian J McGovern
(74) *Attorney, Agent, or Firm* — Hauptman Ham, LLP (57) ABSTRACT

Embodiments may allow the steering wheel to be received in a vehicle body to secure a space for the driver's seat in autonomous driving mode and prevent the steering wheel from interfering with the driver's body, thereby allowing for the driver's comfortable movement while preventing the driver from intervening in steering.

20 Claims, 13 Drawing Sheets

FOLDABLE STEERING WHEEL ASSEMBLY AND STEERING APPARATUS COMPRISING THE SAME

CROSS-REFERENCE TO RELATED APPLICATION

This application claims priority from Korean Patent Application Nos. 10-2020-0043385, filed on Apr. 9, 2020, and 10-2020-0043395, filed on Apr. 9, 2020, and 10-2021-0045468, filed on Apr. 7, 2021, which are hereby incorporated by reference for all purposes as if fully set forth herein.

BACKGROUND

Field

Embodiments relate to a foldable steering wheel assembly and a steering apparatus including the same, and more specifically, to a foldable steering wheel assembly in which a steering wheel may be received in a vehicle body to secure a space for the driver's seat in autonomous driving mode and to prevent the steering wheel from interfering with the driver's body, thereby allowing for the driver's comfortable movement while preventing the driver from intervening in steering, and a steering apparatus including the foldable steering wheel assembly.

Description of Related Art

In recent years, there have been developed automobiles that may navigate to the destination without the driver's manipulation of the steering wheel, accelerator pedal, and brake.

An autonomous vehicle may drive in driver driving mode or autonomous driving mode. In driver driving mode, the driver performs driving. In autonomous driving mode, driving is automatically performed by the autonomous driving system. There is demand for securing a larger space for convenience of the driver during autonomous driving.

If the driving wheel which is positioned in front of the driver is received in the vehicle body in autonomous driving mode, the driver would have more convenience in driving. Since the autonomous vehicle drives in driver driving mode or autonomous driving mode, a need exists for a driving wheel structure that allows the driver to manipulate the driving wheel in driver driving mode, as do conventional, non-autonomous vehicles and that may easily be received in the vehicle body in driver driving mode.

BRIEF SUMMARY

According to embodiments of the disclosure, there are provided a foldable steering wheel assembly in which a steering wheel may be received in a vehicle body to secure a space for the driver's seat in autonomous driving mode and to prevent the steering wheel from interfering with the driver's body, thereby allowing for the driver's comfortable movement while preventing the driver from intervening in steering, and a steering apparatus including the foldable steering wheel assembly.

According to an embodiment, there may be provided a foldable steering wheel assembly, comprising a shaft coupled with a steering shaft while crossing the steering shaft, a steering wheel including at least one coupling part coupled to the shaft and provided to be rotatable around an axial direction of the shaft, a cam unit including a fixed cam fixed to the shaft in a circumferential direction and a movable cam coupled to the at least one coupling part and supported by the fixed cam, and a driver applying torque to the movable cam to locate the steering wheel in a first position where the steering wheel may be manipulated by a driver or a second position to which the steering wheel is rotated around the shaft from the first position.

According to an embodiment, there may be provided foldable steering wheel assembly, comprising a shaft coupled with a steering shaft while crossing the steering shaft, a steering wheel including at least one coupling part coupled to the shaft and provided to be rotatable around an axial direction of the shaft, a cam unit including a fixed cam fixed to the shaft in a circumferential direction and a movable cam coupled to the at least one coupling part and supported by the fixed cam, and a driver applying torque to the at least one coupling part to locate the steering wheel in a first position where the steering wheel may be manipulated by a driver or a second position to which the steering wheel is rotated around the shaft from the first position.

Embodiments may allow the steering wheel to be received in a vehicle body to secure a space for the driver's seat in autonomous driving mode and prevent the steering wheel from interfering with the driver's body, thereby allowing for the driver's comfortable movement while preventing the driver from intervening in steering.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear.

The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
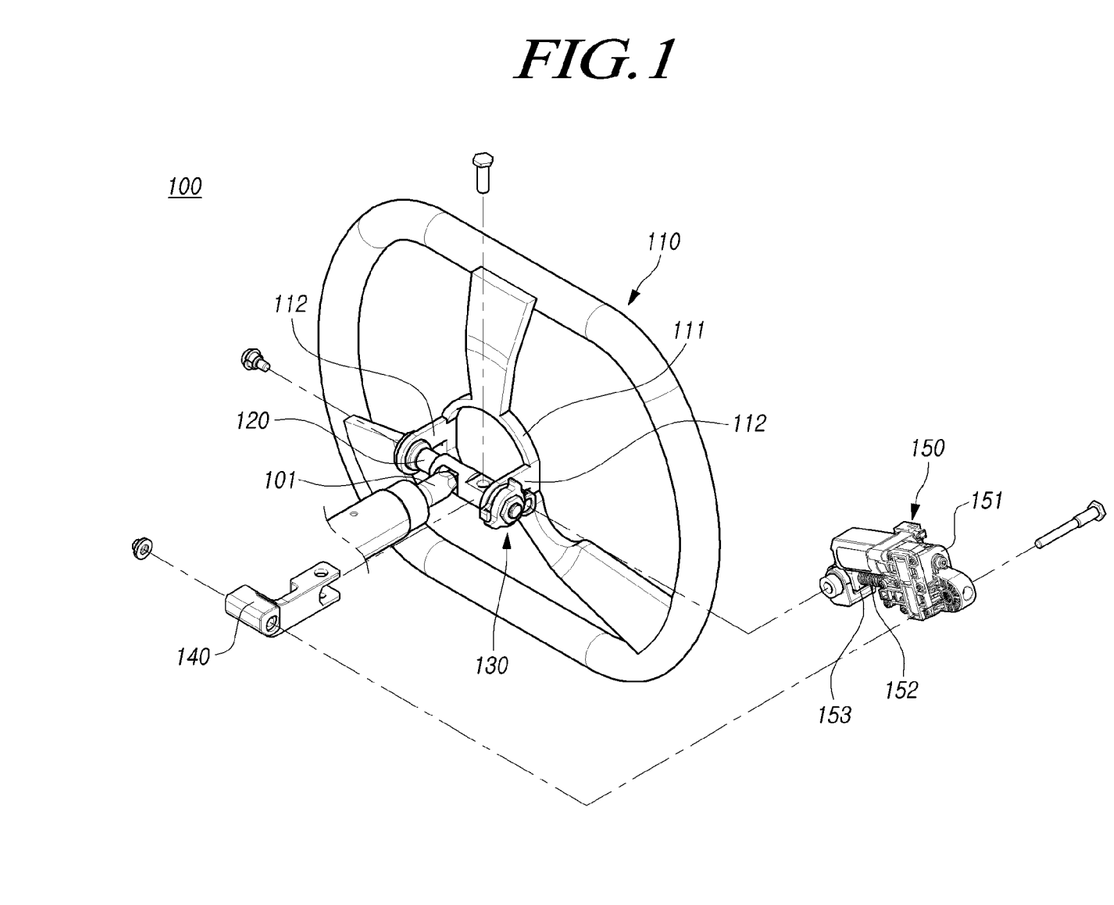
FIG. 1 is an exploded perspective view illustrating a foldable steering wheel assembly according to according to an embodiment.
Figure 2:
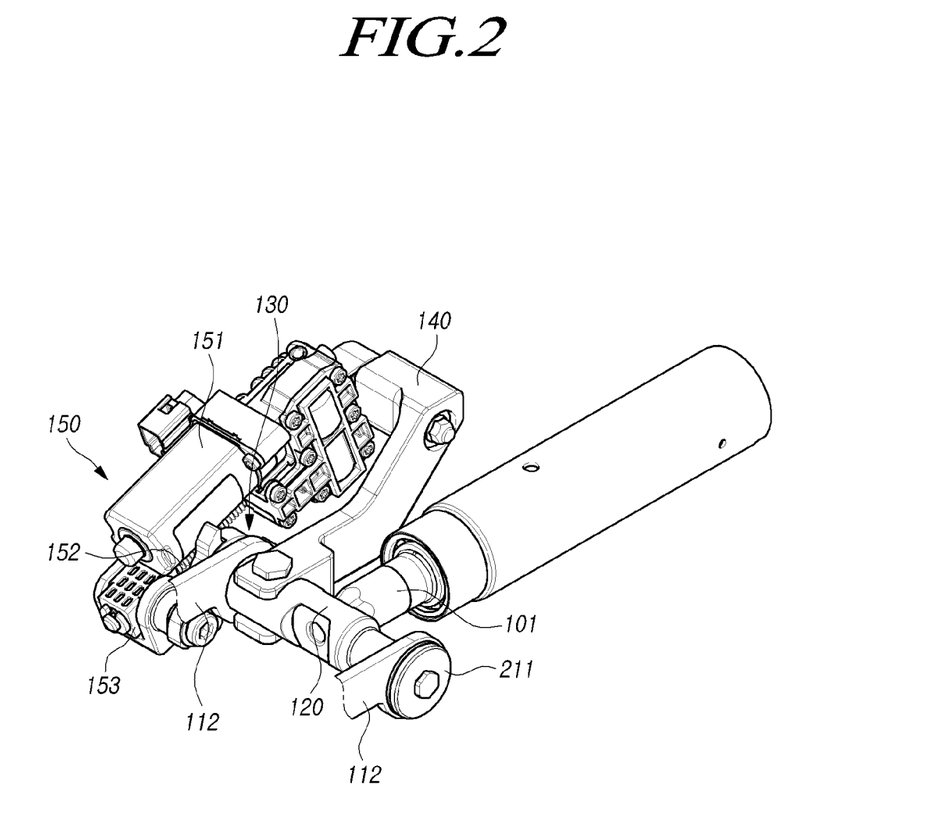
FIG. 2 is a perspective view illustrating an assembled state of the foldable steering wheel assembly of FIG. 1.
Figure 3:
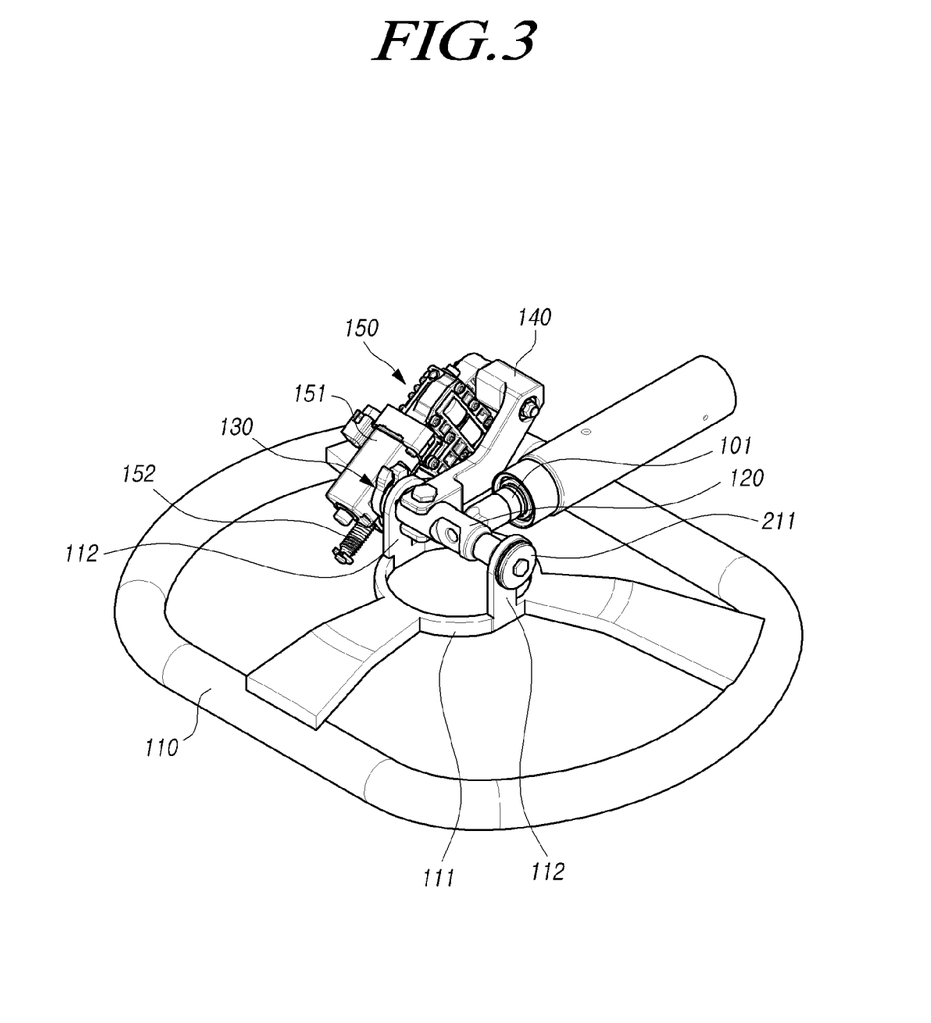
FIG. 3 is a perspective view illustrating a rotated state of the steering wheel of FIG. 2.
Figure 4:
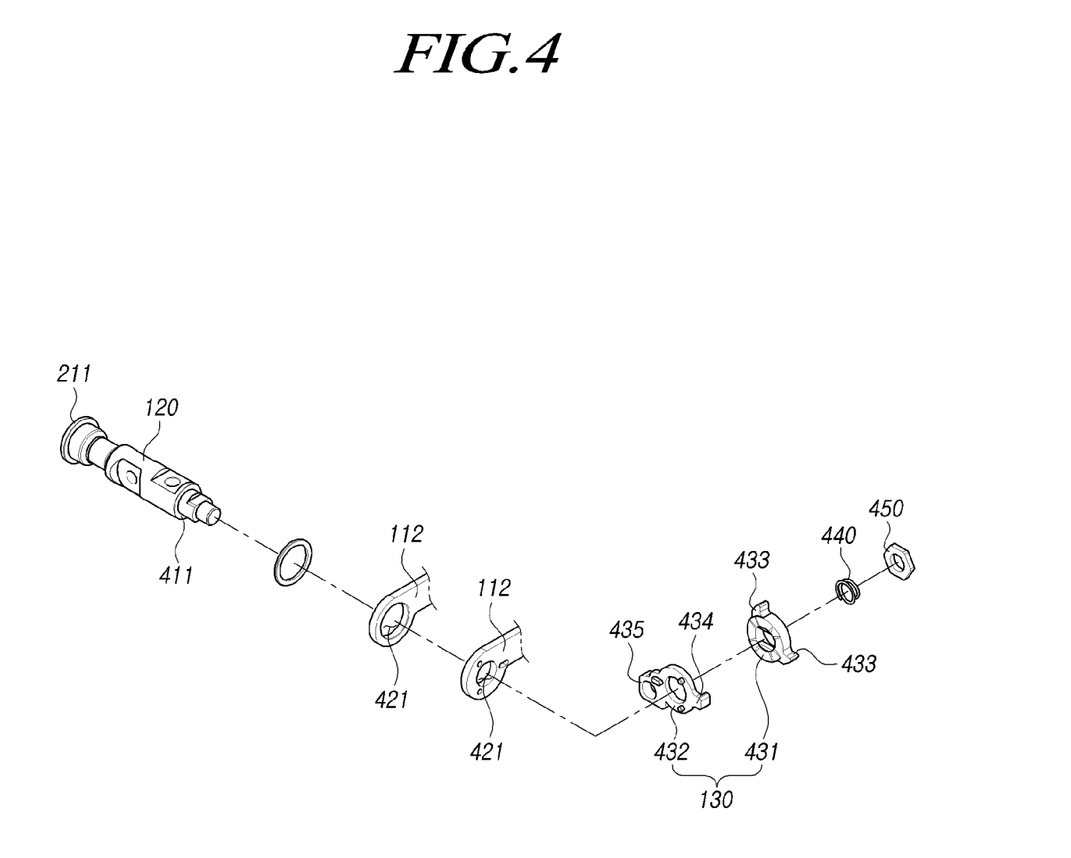
FIG. 4 is an exploded perspective view illustrating part of FIG. 1.
Figure 5:
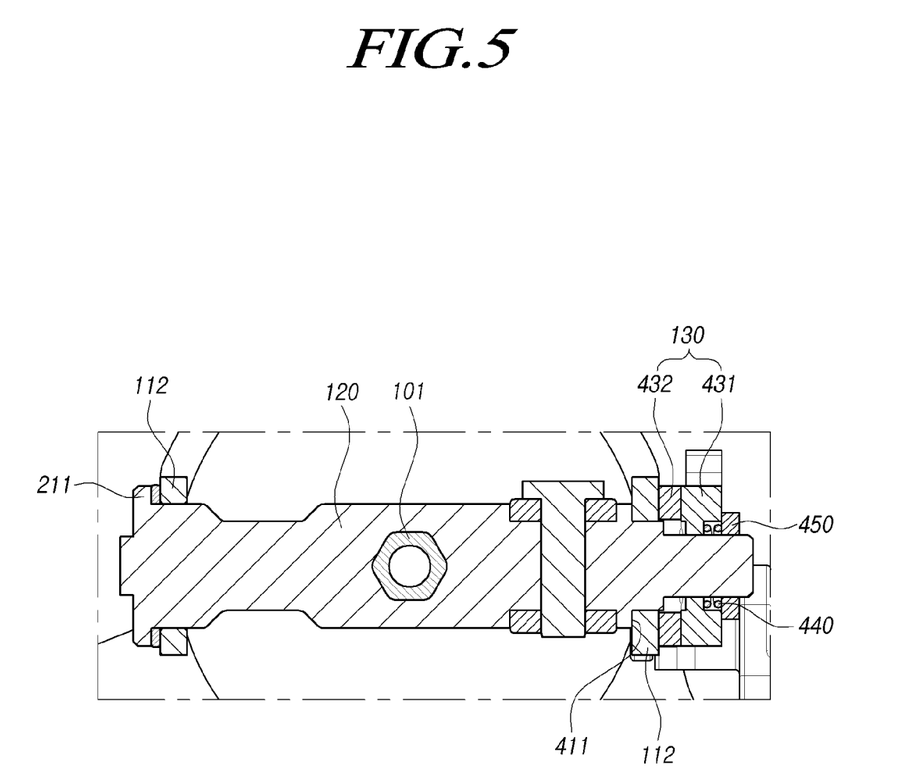
FIG. 5 is a cross-sectional view illustrating part of FIG. 2.
Figure 6:
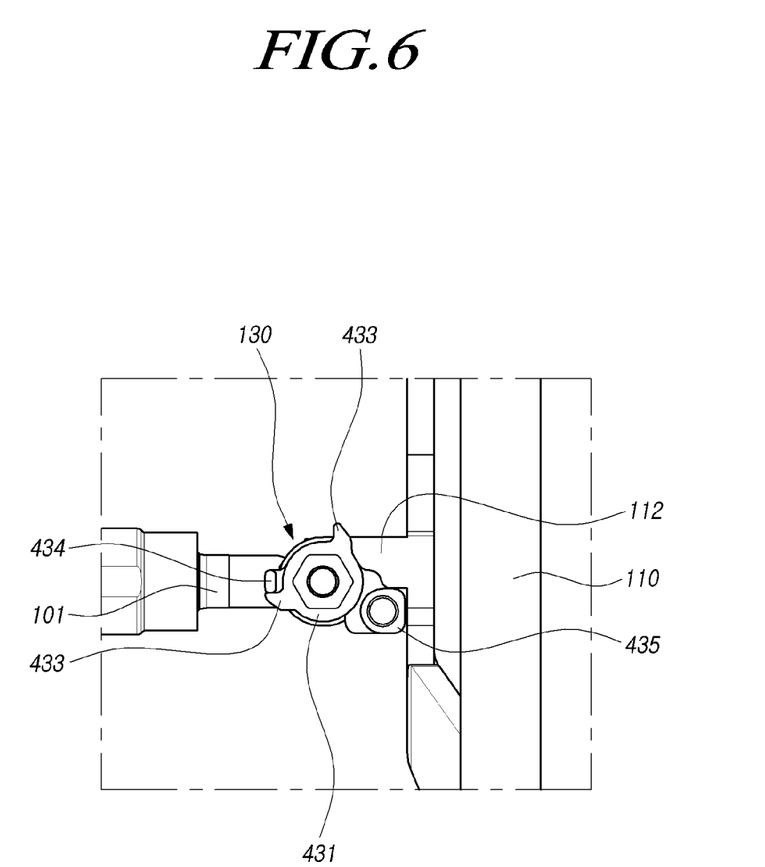
FIGS. 6 and 7 are views illustrating operations of a foldable steering wheel assembly according to an embodiment.
Figure 8:
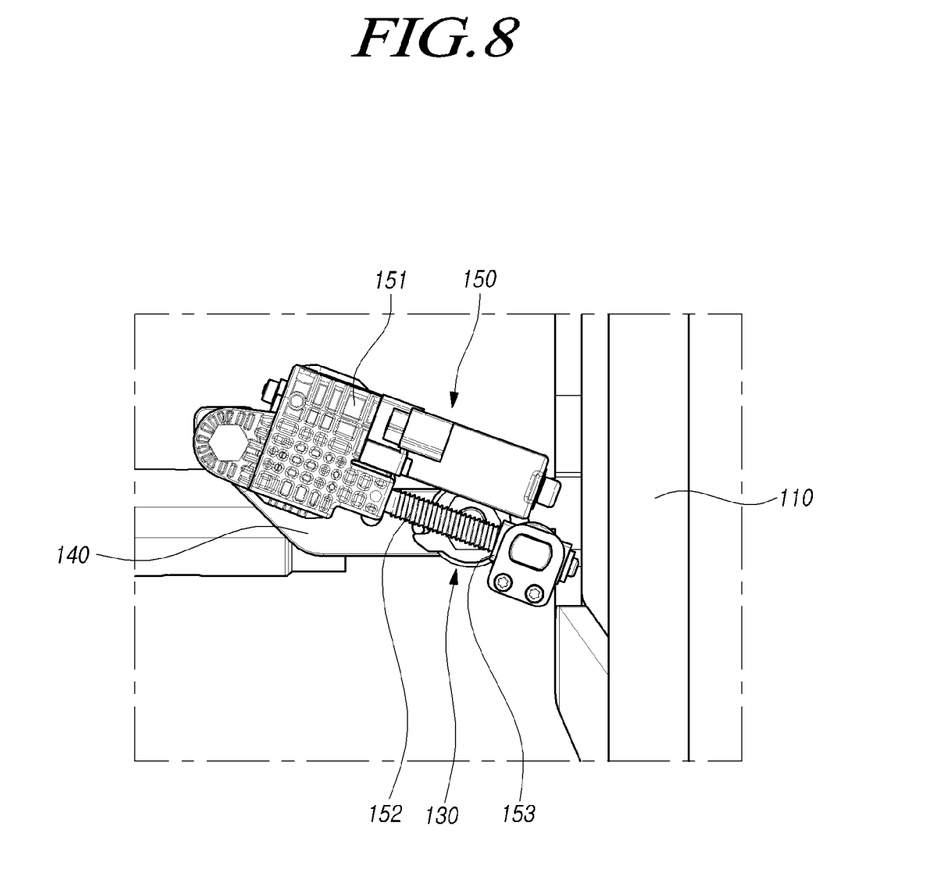
FIGS. 8 and 9 are views illustrating operations of a foldable steering wheel assembly according to an embodiment.
Figure 9:
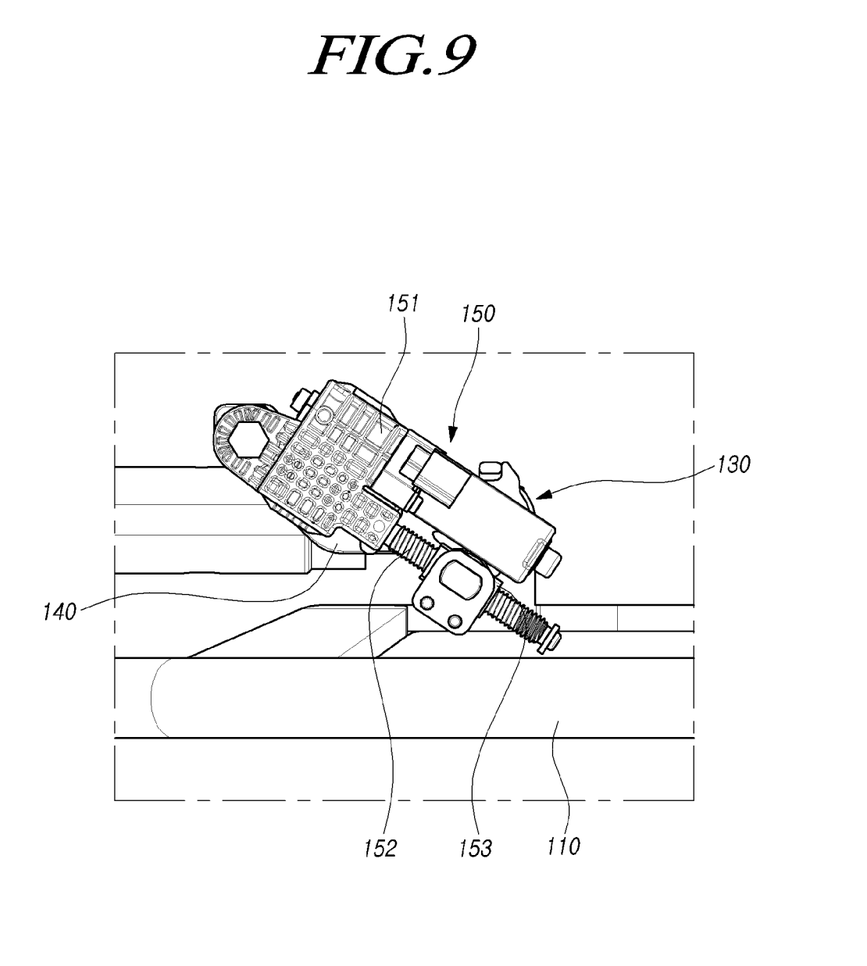
Figure 10:
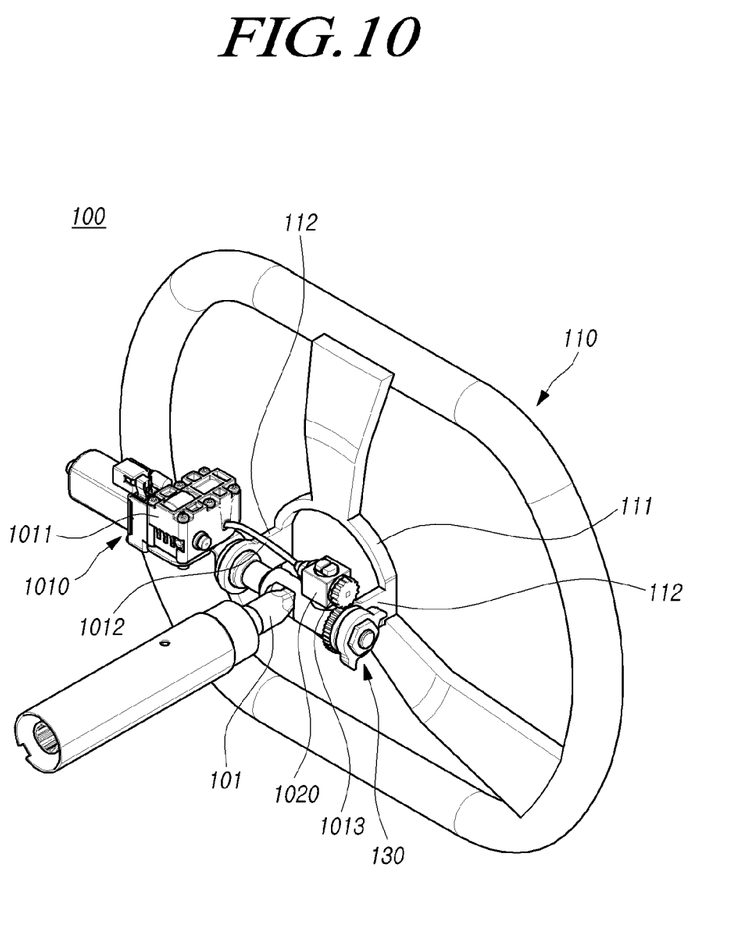
FIG. 10 is a perspective view illustrating a foldable steering wheel assembly according to according to an embodiment.

FIG. 1 is an exploded perspective view illustrating a foldable steering wheel assembly according to an embodiment. FIG. 2 is a perspective view illustrating an assembled state of the foldable steering wheel assembly of FIG. 1. FIG. 3 is a perspective view illustrating a rotated state of the steering wheel of FIG. 2. FIG. 4 is an exploded perspective view illustrating part of FIG. 1. FIG. 5 is a cross-sectional view illustrating part of FIG. 2. FIG. 6 and are views illustrating operations of a foldable steering wheel assembly according to an embodiment. FIGS. 8 and 9 are views illustrating operations of a foldable steering wheel assembly according to an embodiment. FIG. 10 is a perspective view illustrating a foldable steering wheel assembly according to according to an embodiment.

Figure 11:
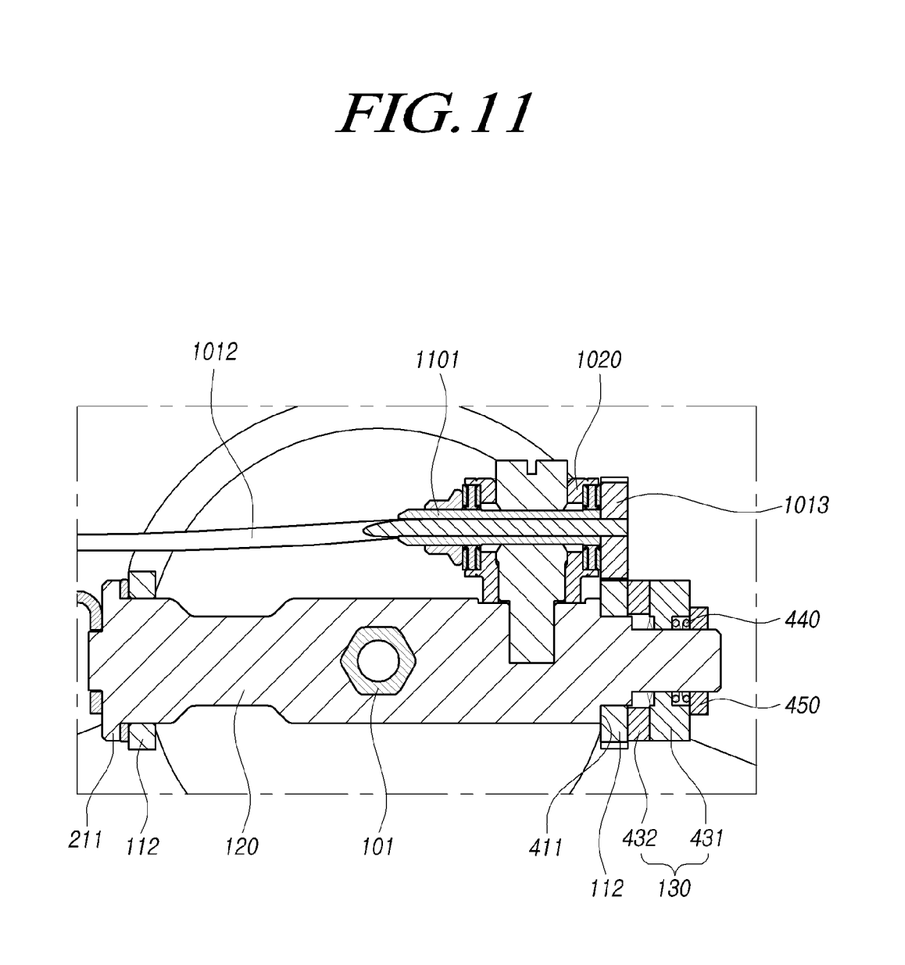
FIG. 11 is a cross-sectional view of FIG. 10.
Figure 12:
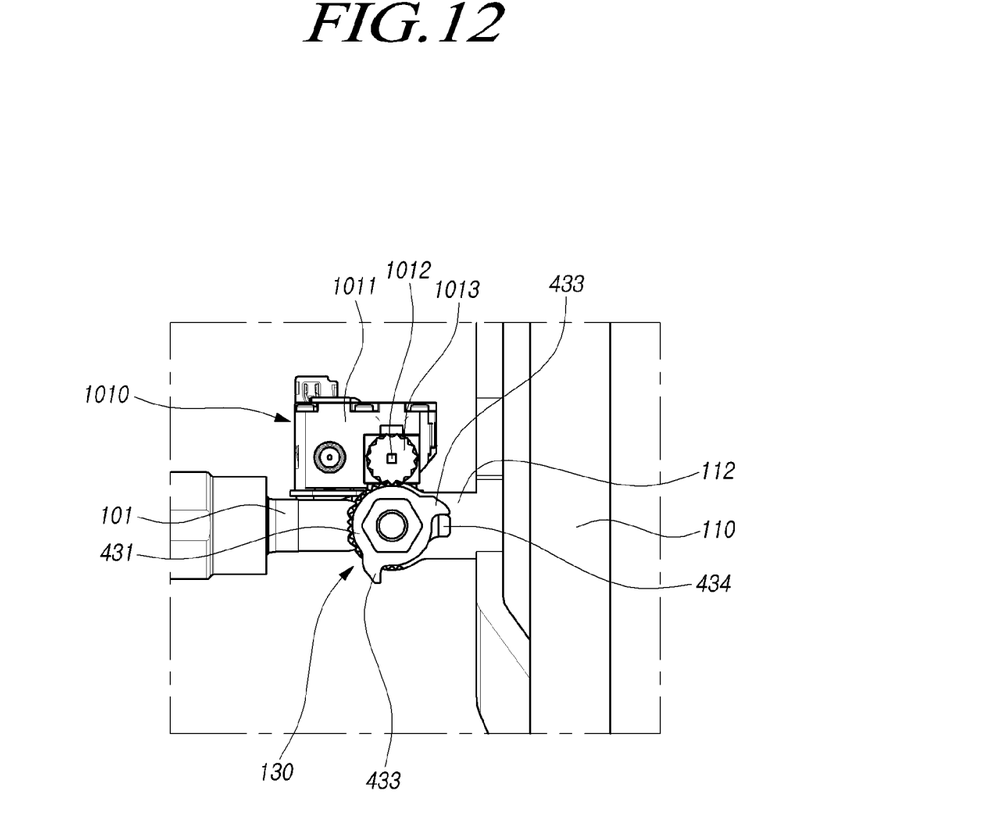
FIGS. 12 and 13 are views illustrating operations of a foldable steering wheel assembly according to an embodiment.
Figure 13:
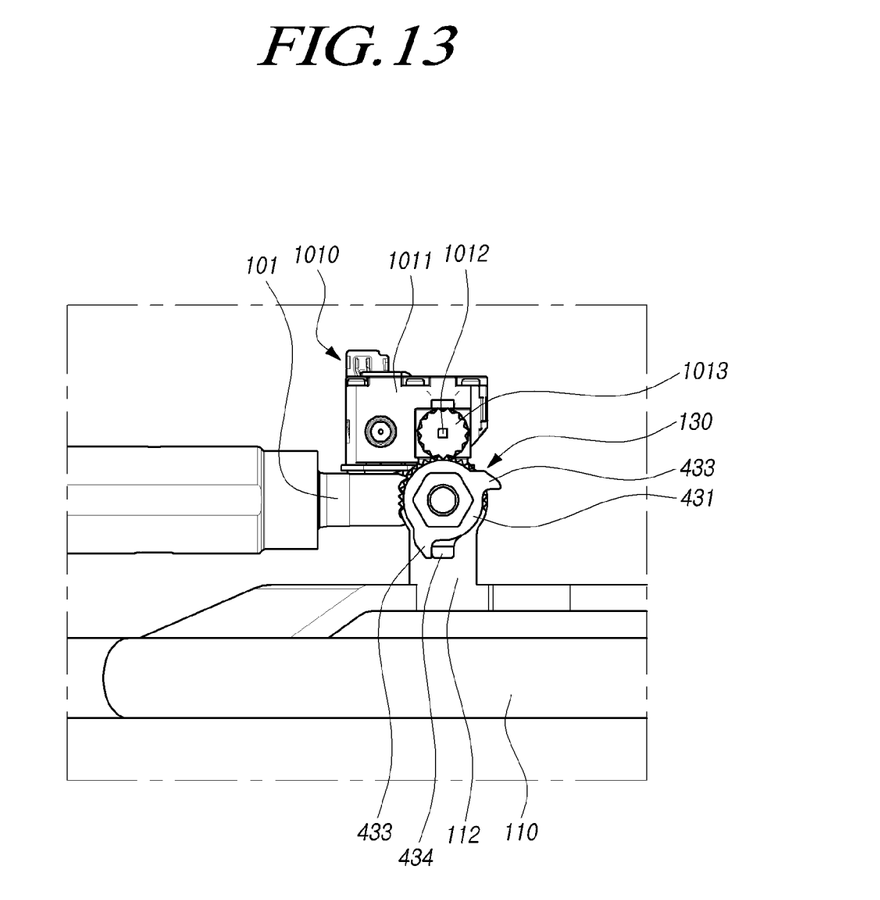

FIG. 11 is a cross-sectional view of FIG. 10. FIGS. 12 and 13 are views illustrating operations of a foldable steering wheel assembly according to an embodiment.

According to an embodiment, a foldable steering wheel assembly 100 includes a steering wheel 110 including a shaft 120 crossing a steering shaft 101 and coupled to the steering shaft 101 and a coupling part 112 coupled to the shaft 120 and provided to be rotatable around an axial direction of the shaft 120, a driver 150 or 1010 for positioning the steering wheel 110 in a first position where a driver may manipulate the steering wheel 110 or a second position to which the steering wheel 110 is rotated around the shaft 120 from the first position, and a cam unit 130 including a fixed cam 431 fixed to the shaft 120 along a circumferential direction and a movable cam 432 coupled to the coupling part 112 and supported by the fixed cam 431 and locking the rotation of the steering wheel 110 in the first position.

According to an embodiment, there may be provided a steering apparatus including the foldable steering wheel assembly 100.

According to an embodiment, the driver 150 or 1010 of the foldable steering wheel assembly 100 may rotate the steering wheel 110 around the shaft 120 and position the steering wheel 110 to the first position or the second position. The driver may rotate the steering wheel 110 by applying torque to the movable cam 432 as illustrated in FIGS. 1 to 9 or applying torque to the coupling part 112 as illustrated in FIGS. 10 to 13. However, the driver is merely an example. According to an embodiment, the driver may be any driver that may rotate the steering wheel 110 and is not limited to those illustrated in the drawings.

The foldable steering wheel assembly 100 is described below with reference to FIGS. 1 to 3.

According to an embodiment, in the foldable steering wheel assembly 100 the steering wheel 110 is coupled to the steering shaft 101 not directly but via the shaft 120. In other words, a hub 111 of the steering wheel 110 is not directly coupled to the steering shaft 101 but is coupled to the shaft 120, which is coupled to the steering shaft 101, and is thus connected with the steering shaft 101.

The shaft 120 is coupled to the steering shaft 101 while crossing the steering shaft 101. In other words, the axial direction of the shaft 120 is perpendicular to the axial direction of the steering shaft 101. The shaft 120 provides the steering wheel 110 with a rotation axis in a direction perpendicular to the axial direction of the steering shaft 101.

The steering wheel 110 includes the coupling part 112 coupled to the shaft 120, and the steering wheel 110 is rotated around the axis of the shaft 120 as the shaft 120 and the coupling part 112 slide each other.

As illustrated in the drawings, the coupling part 112 may be formed to protrude forward from the hub of the steering wheel 110. As the coupling part 112 protruding forward is coupled with the shaft 120, the steering wheel 110 may rotate around the axis of the shaft 120.

The coupling part 112 has an insertion hole 421 into which the shaft 120 is inserted. In other words, the shaft 120 is inserted into the insertion hole 421 and the coupling part 112 and the shaft 120 are coupled together, and the steering wheel 110 is rotated around the axis of the shaft 120 by a slide between the inner circumferential surface of the coupling part 112 and the outer circumferential surface of the shaft 120.

As illustrated in the drawings, the steering wheel 110 may have a pair of coupling parts 112, each of which may have an insertion hole 421 into which the shaft 120 is coupled.

The pair of coupling parts 112 may be coupled to both ends of the shaft 120, and the steering shaft 101 may be coupled to a central portion of the shaft 120. In other words, the pair of coupling parts 112 may be positioned on both sides along the axial direction of the shaft 120 with the axial direction of the steering shaft 101 therebetween. As described below, one of the pair of coupling parts 112 is supported by a supporting part 211, and the other thereof is coupled with the movable cam 432, so that the rotation of the steering wheel 110 is locked as the coupling parts 112 are pressurized by the cam unit 130 along the axial direction of the shaft 120.

By the driver 150, the steering wheel 110 is rotated around the axis of the shaft 120 and is moved from the first position to the second position or from the second position to the first position. In the driver driving mode, the steering wheel 110 is located in the first position to be rotated around the axis of the steering shaft 101 by the driver's manipulation and, upon switching to the autonomous driving mode, the steering wheel 110 may be located in the second position and received in the vehicle body. A hinge bracket 140 for installing the driver 150 may be coupled to the shaft 120, which is described below in detail.

The first position of the steering wheel 110 is a position in which the steering wheel 110 is disposed coaxially with the steering shaft 101 to rotate around the axis of the steering shaft 101 as illustrated in FIGS. 1 and 2. The second position of the steering wheel 110 is a position to which the steering wheel 110 is rotated from the first position around the axis of the shaft 120 as illustrated in FIG. 3. In the drawings, an embodiment in which the second position of the steering wheel 110 faces downward is illustrated. However, the second position of the steering wheel 110 may face upward.

In the second position, the steering wheel 110 may be received inside the vehicle body. For example, as the steering shaft 101 telescopes in, the steering wheel may be received inside the dashboard of the vehicle. Accordingly, in the autonomous driving mode, it is possible to secure a wider space for the driver's seat while preventing the steering wheel from interfering with the driver's body, allowing the driver to move freely and comfortably. During autonomous driving, steering is performed by the system without the driver's steering wheel manipulation. As the steering wheel is received in the vehicle body, it is possible to fundamentally prevent the driver from intervening in steering, such as gripping the steering wheel or interference during movement.

The cam unit 130 includes the fixed cam 431 and the movable cam 432. The fixed cam 431 is fixedly coupled to the shaft 120 in the circumferential direction and does not rotate when the steering wheel 110 rotates. The movable cam 432 is coupled to the coupling part 112 to rotate together with the steering wheel 110 when the steering wheel 110 rotates. The fixed cam 431 and the movable cam 432 have cam surfaces supported by each other, so that when the steering wheel 110 rotates, the fixed cam 431 and the movable cam 432 move away from or close to each other, and accordingly, rotation of the steering wheel 110 is locked or unlocked.

Therefore, when the steering wheel 110 is located in the first position by the driver 150, the rotation is locked by the cam unit 130, thereby preventing the steering wheel 110 from being rotated by the driver or an external force and hence allowing for safe steering in the driver driving mode.

According to an embodiment, the rotation of the steering wheel 110 may be locked in the first position and unlocked in the second position. In other words, when the steering wheel 110 is in the first position, the movable cam 432 and the fixed cam 431 are positioned away from each other, and the coupling part 112 is pressurized towards the supporting part 211, and the rotation of the steering wheel 110 is locked. When the steering wheel 110 is in the second position, the movable cam 432 and the fixed cam 431 come closer to each other, and the pressure applied to the coupling part 112 is released, and the rotation of the steering wheel 110 may be unlocked.

According to another embodiment, the rotation of the steering wheel 110 may be locked not only in the first position but also in the second position. That is, in the first position and the second position, the coupling part 112 is pressurized by the cam part 130 and the rotation of the steering wheel 110 is locked but, while the steering wheel 110 moves from the first position to the second position or from the second position to the first position, the pressure applied to the coupling unit 112 by the cam unit 130 is released, and the rotation of the steering wheel 110 may thus be unlocked.

Referring to FIGS. 4 and 5, the supporting part 211 which is supported in the axial direction of the shaft 120 is formed in one of the pair of coupling parts 112 in the shaft 120, and the movable cam 432 is fixed to the other of the pair of coupling parts 112. The coupling part 112 and the movable cam 432 may be coupled together as protrusions formed in the movable cam 432 are press-fitted into holes formed in the coupling part 112.

The supporting part 211 is formed at one end of the shaft 120 to have a larger diameter than that of the portion to which the coupling part 112 is coupled and is thus supported by the coupling part 112 in the axial direction. A bearing, e.g., a needle thrust bearing, may be provided between the coupling part 112 and the support part 211 to support the rotation of the coupling part 112.

The other end of the shaft 120 is coupled to the other coupling part 112 and may be formed with a step portion 411 where the coupling part 112 is supported in the axial direction. The other end of the shaft 120 and the fixed cam 431 are formed with chamfered portions that are supported by each other to allow the shaft 120 and the fixed cam 431 may be fixed in the circumferential direction.

The movable cam 432 may be positioned between the coupling part 112 and the fixed cam 431 and may be supported by the fixed cam 431 and the cam surface. There may further be provided a spring 440 for pressurizing the fixed cam 431 toward the movable cam 432 and a nut 450 coupled to the shaft 120 to support the spring 440.

The fixed cam 431 may be further formed with a hinge part 435 that is hinged to a nut screw 153, which is described below in detail.

Figure 7:
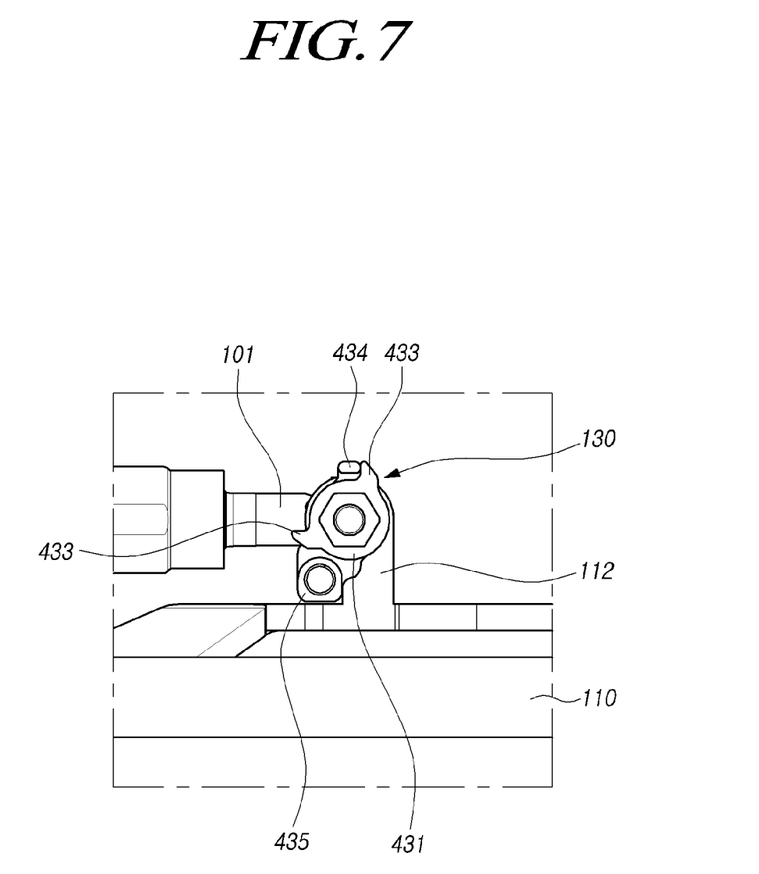

Referring to FIGS. 6 and 7, the fixed cam 431 may have first stoppers 433, and the movable cam 432 may have a second stopper 434. In the first position and the second position of the steering wheel 110, the first stoppers 433 and the second stopper 434 may be supported by each other, restricting the rotation range of the steering wheel 110.

In the embodiment illustrated in the drawings, the fixed cam 431 includes a pair of first stoppers 433 spaced apart from each other in the circumferential direction. As the second stopper 434 of the movable cam 432 moves between the first stoppers 433, the first stoppers 433 and the second stopper 434 are supported in the first position or the second position of the steering wheel 110. The arrangement or shape of the first stoppers 433 and the second stopper 434 is not limited to the embodiment illustrated in the drawings, but the first stoppers 433 and the second stopper 434 may rather have other various shapes.

As the rotation range of the steering wheel 110 is restricted by the first stoppers 433 and the second stopper 434, the steering wheel 110 may be precisely located in the first position or second position when the steering wheel 110 is rotated by the driver 150.

Described below is the driver 150 for rotating the steering wheel 110.

The steering wheel 110 is rotated. The driver 150 may include a bolt screw 152 and a nut screw 153 to transmit power to the movable cam 432.

FIGS. 1 to 9 illustrate an embodiment in which the driver 150 including the bolt screw 152 and the nut screw 153 applies torque to the movable cam 432 to rotate the steering wheel 110.

Specifically, referring to FIGS. 1, 8, and 9, the driver 150 may include the nut screw 153 hinged to the movable cam 432 and an actuator 151 for rotating the bolt screw 152 coupled with the nut screw 153 and hinged to a hinge bracket 140 fixed to the shaft 120.

The movable cam 432 has a hinge part 435 to be hinged with the nut screw 153. The nut screw 153 may be directly hinged with the hinge part 435 but, as illustrated in the drawings, it is preferable that the nut screw 153 is hinged with the hinge part 435 via a separate bracket.

One end of the hinge bracket 140 is coupled to the shaft 120, and the actuator 151 is hinged to the other end of the hinge bracket 140. The actuator 151 includes a motor, a decelerator, and a housing to which the motor is coupled and which receives the decelerator, and the housing may be hinged to the hinge bracket 140.

The bolt screw 152 is connected to the motor through the decelerator and is rotated as the motor is driven. As the bolt screw 152 is coupled with the nut screw 153, the nut screw 153 slides along the axis of the bolt screw 152 when the bolt screw 152 rotates.

Therefore, torque is applied to the movable cam 432 to allow the steering wheel 110 to rotate when the actuator 151 is driven by a slide of the nut screw 153 over the bolt screw 152, the hinge coupling of the actuator 151 to the hinge bracket 140, and the hinge coupling of the nut screw 153 to the movable cam 432.

An embodiment illustrated in FIGS. 10 to 13 is described below. However, for convenience of description, the same reference numerals are used to denote the same components as those illustrated in FIGS. 1 to 9, and the description focuses primarily on the differences, with no detailed description of the same elements given below.

Referring to FIG. 10, in the foldable steering wheel assembly 100 according to an embodiment, the coupling part 112 of the steering wheel 110 is coupled to the shaft 120 and rotated in the same manner as in the above-described embodiments. A cam unit 130 for locking and unlocking the rotation of the steering wheel 110 is coupled to the shaft 120.

The driver 1010 includes a gear 1013 and rotates the steering wheel 110 by applying torque to the coupling part 112. Specifically, the coupling part 112 includes gear teeth. The driver 1010 includes the gear 1013 engaged with the gear teeth of the coupling part 112 and an actuator 1011 for rotating the gear 1013 and applies torque to the coupling part 112.

The gear teeth of the coupling part 112 may be formed on the outer surface of the coupling part 112 as illustrated in the drawings.

The actuator 1011 includes a motor, a decelerator, and a housing to which the motor is coupled and which receives the decelerator, and may be coupled to the shaft 120 by a bracket.

The actuator 1011 and the gear 1013 may be connected together through a cable 1012. The cable 1012 may be formed with multiple flexible twisted wires to transmit torque.

One end of the cable 1012 is coupled to the gear 1013 and the other end is coupled to the decelerator in the housing of the actuator 1011. Referring to FIGS. 10 to 11, a supporting bracket 1020 supporting the end coupled with the gear 1013 of the cable 1012 may be coupled to the shaft 120.

A holder 1101 for receiving one end of the cable 1012 is rotatably supported on the support bracket 1020. The holder 1101 is formed in a hollow cylindrical shape to receive an end of the cable 1012, and the holder 1101 may be supported by the supporting bracket 1020 by a bearing. Accordingly, the power from the actuator 1011 is transmitted to the gear 1013 through the cable 1012 by the supporting bracket 1020 and the holder 1101.

Referring to FIGS. 12 to 13, the movable cam 432 and the fixed cam 431 are provided with first stoppers 433 and a second stopper 434 for restricting the rotation range of the steering wheel 110. Unlike in the above-described embodiments, the movable cam 432 lacks a hinge part. The torque from the driver 1010 is transmitted to the steering wheel 110 by gear engagement between the gear 1013 and the coupling part 112, rotating the steering wheel 110. When the steering wheel 110 is in the first position or the second position, the first stoppers 433 and the second stopper 434 are supported by each other, restricting the rotation range of the steering wheel 110.

The foldable steering wheel assembly having the above described shape and the steering apparatus including the same may allow the steering wheel to be received in a vehicle body to secure a space for the driver's seat in autonomous driving mode and prevent the steering wheel from interfering with the driver's body, thereby allowing for the driver's comfortable movement while preventing the driver from intervening in steering.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A foldable steering wheel assembly, comprising:
    a shaft coupled with a steering shaft while crossing the steering shaft;
    a steering wheel including at least one coupling part coupled to the shaft and provided to be rotatable around an axial direction of the shaft;
    a cam unit including a fixed cam fixed to the shaft in a circumferential direction and a movable cam coupled to the at least one coupling part and supported by the fixed cam; and
    a driver applying torque to the movable cam to locate the steering wheel in a first position where the steering wheel may be manipulated by a user or a second position to which the steering wheel is rotated around the shaft from the first position.

2. The foldable steering wheel assembly of claim 1, wherein the at least one coupling part is formed to protrude forward from a hub of the steering wheel.

3. The foldable steering wheel assembly of claim 1, wherein the at least one coupling part includes a coupling hole through which the shaft is inserted.

4. The foldable steering wheel assembly of claim 1, wherein the at least one coupling part includes a pair of coupling parts coupled to two opposite ends of the shaft, and wherein a central portion of the shaft is coupled with the steering shaft.

5. The foldable steering wheel assembly of claim 4, wherein
the shaft includes a supporting part supported by one of the pair of coupling parts in the axial direction of the shaft, wherein the movable cam is fixed to the other of the pair of coupling parts, and wherein
the one of the pair of coupling parts is pressurized by the cam unit in a direction in which the one of the pair of coupling parts faces the supporting part to lock rotation of the steering wheel.

6. The foldable steering wheel assembly of claim 1, wherein the rotation of the steering wheel is locked by the cam unit in the first position.

7. The foldable steering wheel assembly of claim 1, wherein the fixed cam includes a first stopper, and the movable cam includes a second stopper, and wherein the first stopper and the second stopper are supported by each other in the first position and second position of the steering wheel.

8. The foldable steering wheel assembly of claim 1, wherein the driver includes:
a nut screw hinged to the movable cam; and
an actuator hinged to a hinge bracket fixed to the shaft and rotating a bolt screw coupled to the nut screw.

9. A steering apparatus including the foldable steering wheel assembly of claim 1.

10. A foldable steering wheel assembly, comprising:
a shaft coupled with a steering shaft while crossing the steering shaft;
a steering wheel including at least one coupling part coupled to the shaft and provided to be rotatable around an axial direction of the shaft;
a cam unit including a fixed cam fixed to the shaft in a circumferential direction and a movable cam coupled to the at least one coupling part and supported by the fixed cam; and
a driver applying torque to the at least one coupling part to locate the steering wheel in a first position where the steering wheel may be manipulated by a user or a second position to which the steering wheel is rotated around the shaft from the first position.

11. The foldable steering wheel assembly of claim 10, wherein the at least one coupling part is formed to protrude forward from a hub of the steering wheel.

12. The foldable steering wheel assembly of claim 10, wherein the at least one coupling part includes a coupling hole through which the shaft is inserted.

13. The foldable steering wheel assembly of claim 10, wherein the at least one coupling part includes a pair of coupling parts coupled to two opposite ends of the shaft, and wherein a central portion of the shaft is coupled with the steering shaft.

14. The foldable steering wheel assembly of claim 13, wherein
the shaft includes a supporting part supported by one of the pair of coupling parts in the axial direction of the shaft, wherein the movable cam is fixed to the other of the pair of coupling parts, and wherein
the one of the pair of coupling parts is pressurized by the cam unit in a direction in which the one of the pair of coupling parts faces the supporting part to lock rotation of the steering wheel.

15. The foldable steering wheel assembly of claim 10, wherein rotation of the steering wheel is locked by the cam unit in the first position.

16. The foldable steering wheel assembly of claim 10, wherein the fixed cam includes a first stopper, and the movable cam includes a second stopper, and wherein the first stopper and the second stopper are supported by each other in the first position and second position of the steering wheel.

17. The foldable steering wheel assembly of claim 10, wherein the at least one coupling part includes gear teeth, and wherein
the driver includes:
a gear engaged with the gear teeth of the at least one coupling part; and
an actuator for rotating the gear.

18. The foldable steering wheel assembly of claim 17, wherein the actuator and the gear are connected to each other via a cable.

19. The foldable steering wheel assembly of claim 18, wherein a supporting bracket for supporting an end of the cable, coupled with the gear, is coupled to the shaft.

20. A steering apparatus including the foldable steering wheel assembly of claim 10.

* * * * *